UNITED STATES PATENT OFFICE.

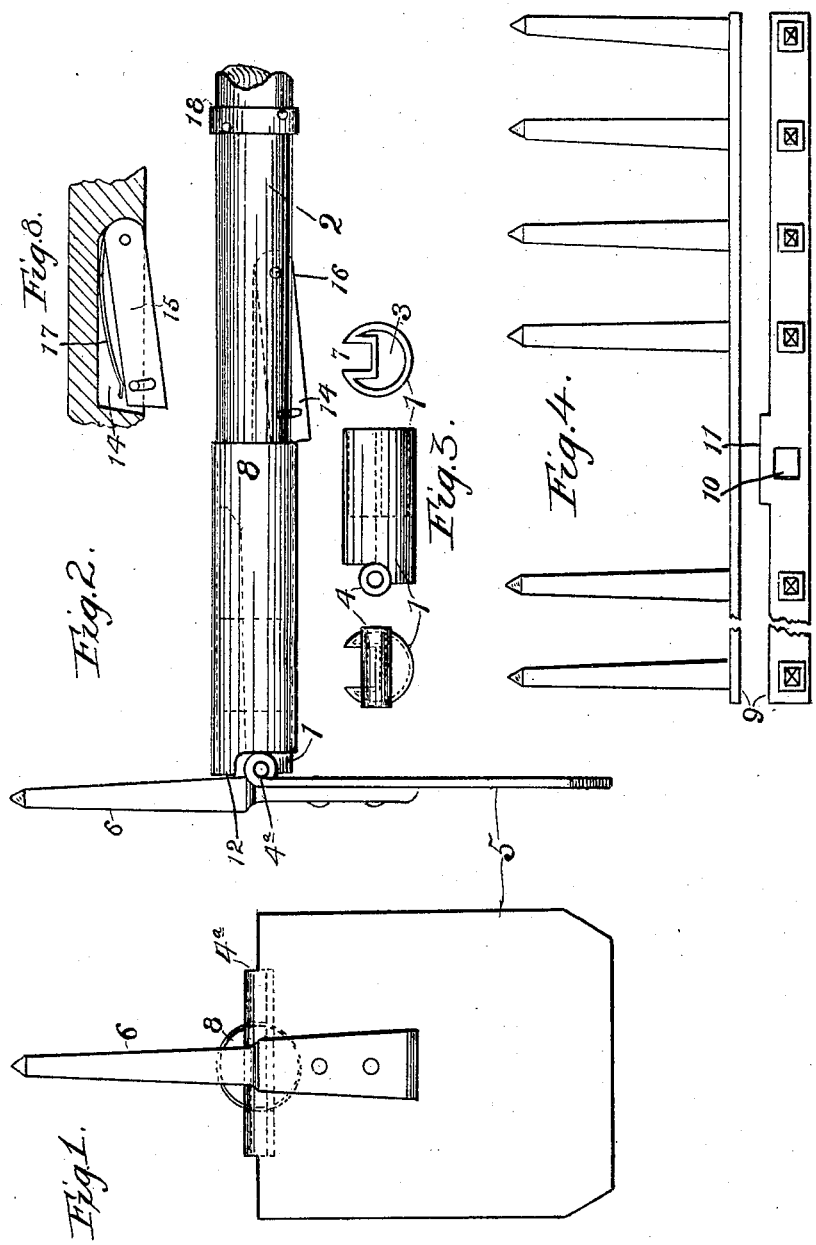

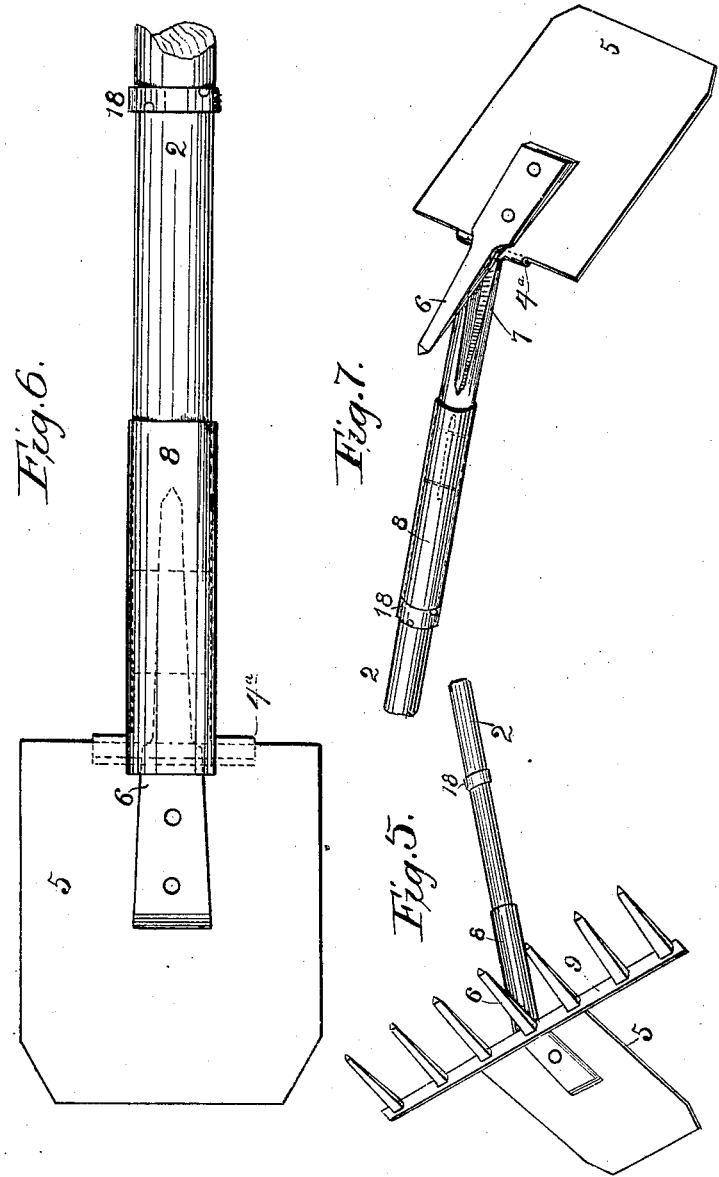

CHARLES WILLIAM DEUSSEN, OF NEW YORK, N. Y.

GARDEN-TOOL.

977,604.  Specification of Letters Patent.  Patented Dec. 6, 1910.

Application filed July 17, 1909. Serial No. 508,218.

*To all whom it may concern:*

Be it known that I, CHARLES WILLIAM DEUSSEN, citizen of the United States, residing at New York, in the county of New York and State of New York, have invented certain new and useful Improvements in Garden-Tools, of which the following is a specification.

My invention relates to improvements in garden tools and is especially designed for tilling flower gardens, beds and borders.

The objects of my invention are,—1—to provide a tool that may be used as a hoe, pick, rake, spade or shovel, at will of the operator; 2—to provide a combination tool that may be quickly and conveniently transformed from one kind of a garden tool to another kind without the use of tools for that purpose. I attain these objects by the mechanism illustrated in the accompanying drawings, in which, Figure 1 is the spade-hoe-pick combination as viewed from the left of Fig. 2. Fig. 2 is the same combination viewed from a point perpendicular to the length of the handle, which is shown broken off at the right. Fig. 3 is a longitudinal view of the ferrule, a cross section thereof shown at the right and an end view thereof at the left. Fig. 4 is an inverted elevation of a rake attachment, a plan view thereof shown thereunder. Fig. 5 is a perspective view of the tool shown in combination for hoeing and for raking, a portion of the handle being broken off. Fig. 6 shows position as a spade, the handle broken off. Fig. 7 shows position as a spade or shovel, in perspective, the retaining sleeve out of engagement with the pick. Fig. 8 is a longitudinal section of a portion of the handle containing the latch.

Having reference to the drawings, in which similar numerals designate similar parts throughout, the basal number 1 is a cylindrically formed piece of metal, comprising a ferrule for the handle 2 an end of which is fitted into the socket 3 of the ferrule.

Integrally formed on the ferrule is a hinge connection 4, to which is pivoted a mate hinge connection 4ª, integrally united with a metal blade 5, having integrally united therewith a pick 6, comprising a narrow hoeing member and a retaining shank for the spade adjustment and a central tooth for the rake attachment which is secured thereto when desired.

When adjusted as a spade or shovel, the shank or pick 6, is retained in the cavity 7, and under the sleeve 8, coöperating with the hinge connection 4, to hold the spade rigidly in correct position. When adjusted as a hoe and pick, the extension 12, of the sleeve 8, abuts against the base of the tooth, operating to hold it in correct position for hoeing or picking. The rake head 9, is adapted for attachment to the pick 6, by means of a centrally located hole 10 in the rake head fitting around the base of the pick, and a lip 11, extending under the extension 12, of the sleeve 8, whereupon the pick 6, becomes a part of the rake, and acts as one of the teeth thereof, and the tool becomes a combined rake and hoe as in Fig. 5.

The slot 14, in the handle 2, contains a latch 15 pivotally connected with the handle at 15, and held by a spring 17, in its normal position for retaining the sleeve normally in conjunction with the ferrule.

When it is desired to change the combination of the tool, the latch is depressed, the sleeve slid out of engagement with the lip 11, and the pick 6, adjusted as desired, whereupon the sleeve is returned to its normal position, and the spring 17, actuates the latch which regains its normal position and retains the sleeve in its normal position.

A collar 18, offsets the tendency of the sleeve to slide off the handle.

Having described my invention, I claim and desire to secure by Letters Patent:

1. The combination of a garden tool having a tooth disposed perpendicular to the axis of the handle, a rake attachment having a centrally disposed hole which engages the tooth, and means for holding the rake in engagement with the tooth, all substantially as specified.

2. The combination of a garden tool having a tooth secured to the ferrule, a rake head having a centrally disposed hole fitted to the tooth, a sleeve having a slidable engagement with the handle for engaging a lip on the rake head, and means for retaining the sleeve in its normal position, all substantially as shown and specified.

In testimony whereof I affix my signature, in presence of two witnesses.

CHARLES WILLIAM DEUSSEN.

Witnesses:
JAMES R. CLEAMATER,
JOHN NEVINS.